US006688292B2

(12) United States Patent
Ruppel et al.

(10) Patent No.: US 6,688,292 B2
(45) Date of Patent: Feb. 10, 2004

(54) CHARGE AIR COOLER AND METHOD OF MAKING AND OPERATING SAME

(75) Inventors: Wolfgang Ruppel, Bad Liebenzell (DE); Günther Schmalzried, Korb (DE)

(73) Assignee: Behr Industrietechnik GmbH & Co., Stuttgart (DE)

( * ) Notice: Subject to any disclaimer, the term of this patent is extended or adjusted under 35 U.S.C. 154(b) by 0 days.

(21) Appl. No.: 09/745,447

(22) Filed: Dec. 26, 2000

(65) Prior Publication Data

US 2002/0011242 A1 Jan. 31, 2002

(30) Foreign Application Priority Data

Dec. 23, 1999 (DE) .......................... 199 62 391

(51) Int. Cl.$^7$ ............................... F02B 33/00
(52) U.S. Cl. ................ 123/563; 165/134.1; 60/599
(58) Field of Search ............... 123/563, 41.31; 60/599; 165/41, 51, 260, 133, 134.1, 905, 145; 428/654

(56) References Cited

U.S. PATENT DOCUMENTS

| | | | | |
|---|---|---|---|---|
| 2,240,203 A | * | 4/1941 | Armacost | 165/134.1 |
| 3,439,657 A | | 2/1967 | Gratzmuller | 123/563 |
| 3,355,877 A | | 12/1967 | Chaffiote | 60/599 |
| 3,450,109 A | * | 6/1969 | Gratzmuller | 60/599 |
| 4,474,162 A | | 10/1984 | Mason | 123/563 |
| 5,394,854 A | | 3/1995 | Edmaier et al. | 123/563 |
| 5,758,718 A | | 6/1998 | Lazzer et al. | |
| 5,797,265 A | * | 8/1998 | Hagglund | 60/599 |
| 5,857,266 A | * | 1/1999 | Raybould et al. | 165/133 |
| 6,155,337 A | * | 12/2000 | Rosengarten et al. | 165/133 |
| 6,316,126 B1 | * | 11/2001 | Hasegawa et al. | 428/654 |

FOREIGN PATENT DOCUMENTS

| | | | |
|---|---|---|---|
| CH | 516740 | 1/1972 | .......... 60/599 |
| DE | 1451901 | 5/1969 | |
| DE | 1957572 | 3/1971 | |
| DE | 2342787 | 3/1975 | |
| DE | 2655017 | 8/1978 | .......... 123/563 |
| DE | 2810191 | 11/1980 | |
| DE | 3028674 | 3/1981 | |
| DE | 4114704 | 11/1992 | .......... 123/563 |
| DE | 4240239 | 6/1994 | |
| DE | 29723421 | 11/1998 | |
| EP | 0750106 | 12/1996 | .......... 60/599 |

OTHER PUBLICATIONS

Copy of the International Search Report.

* cited by examiner

Primary Examiner—Thomas Denion
Assistant Examiner—Thai-Ba Trieu
(74) Attorney, Agent, or Firm—Crowell & Moring LLP

(57) ABSTRACT

A charge air cooler for internal-combustion engines, having at least two cooling circulations which are guided through heat exchanger blocks which are connected behind one another in the flow direction of the air and have different coolant temperatures. At least the heat transfer block provided as the first heat transfer block in the flow direction of the air is produced of a more erosion-resistant and temperature-stable material than the heat transfer block which fallow and is situated in la high-temperature coolant circuit in which the coolant temperature is selected to be as high as possible.

10 Claims, 2 Drawing Sheets

CHARGE AIR COOLER AND METHOD OF MAKING AND OPERATING SAME

BACKGROUND AND SUMMARY OF THE INVENTION

The invention relates to a charge air cooler for internal-combustion engines, having at least two cooling circulations which are guided through heat exchanger blocks which are connected behind one another in the flow direction of the air and have different coolant temperatures.

Charge air coolers for internal-combustion engines are known (German Patent Document DE OS 23 42 787). Because, in the case of such charge air coolers, the entering air has very high temperatures, there is the danger that the heat exchanger elements situated on the inlet side—as a rule, therefore tubes equipped with fins—are very highly thermally stressed and therefore may be damaged, because erosion caused by cavitation phenomena may occur, in addition to considerable thermal expansions.

In the case of the above-mentioned known charge air coolers, it was attempted to solve this problem in that the heat transfer on the first rows of tubes was kept as low as possible but, in the rows of tubes which follow, the heat exchange was increased to the optimum. It was endeavored to achieve this either in that the number of fins per tubes was selected to be rising in the direction of the flowing-through air, or in that the first row of tubes was constructed without fins or was even provided with a heat insulation. Charge air coolers of this type therefore require very high expenditures. At the very high entry temperatures of the charge air of up to 300° and even higher which are becoming increasingly customary, such measures are either no longer sufficient or result in charge air coolers whose dimensions are very large. This also applies to charge air coolers according to German Patent Document DE 196 44 584 A1 (corresponding to U.S. Pat. No. 5,845,701), in which it was attempted to reduce the thermal stress to finned tube blocks of charge air coolers in the area of the lateral parts in that the outermost corrugated fin layer, which rests against the lateral parts, was in each case displaced against the charge air flow over the entry edge of the finned tube block toward the front into the entry area for the charge air formed by the lateral parts and the radiator tanks. Although, as a result, a faster warming-up of the lateral parts can be achieved, the problem of occurring erosion in the entry area cannot be easily solved in this manner.

From German Patent Document DE 41 14 704 C1, it is known to carry out the cooling of charge air in two stages. There, the cooling first takes place in a high-temperature charge air cooler which is connected with a high-temperature intercooler, and then in a low-temperature charge air cooler which is situated in a circulation with a low-temperature intercooler. These two charge air coolers are then followed by an engine oil cooler and a transmission oil cooler. The charge air cooler therefore corresponds to the initially mentioned charge air cooler which is characterized by at least two cooling circulations which are guided through heat exchanger blocks connected behind one another in the flow direction of the air. These two cooling circulations have different coolant temperatures. However, possibilities of designing the high-temperature cooler such that it will permanently withstand the high entry temperatures without increasing the dimensions, are not mentioned there.

It is therefore an object of the present invention to construct a charge air cooler such that charge air of very high temperatures can be cooled at economically acceptable expenditures, without the occurrence of the above-mentioned problems.

For achieving this object, it is suggested according to the invention that, for a charge air cooler of the initially mentioned type, at least the heat transfer block provided as the first heat transfer block in the flow direction of the air be produced of a more erosion-resistant and temperature-stable material than the heat transfer blocks which follow and is situated in a high-temperature coolant circuit in which the coolant temperature is selected to be as high as possible.

As a result of this measure, it becomes possible to provide on the entry side of the charge air a front-end cooler which, from the beginning, is designed such that first the very high charge air temperatures are cooled down to an acceptable degree, so that then the heat transfer blocks which follow can be designed according to the known criteria. Thus, a coolant temperature can, for example, be provided for the front-end cooler which reduces the temperature gradient between the entering charge air and the coolant temperature. Because the front-end cooler is also made of a more temperature-stable material than the heat transfer blocks which follow, it becomes possible to largely eliminate the risk of damage at the entry of the charge air.

In another embodiment, it can be provided that the first two heat transfer blocks of three heat transfer blocks are situated in a high-temperature coolant circulation and only the last heat transfer block is situated in a low-temperature coolant circulation. The temperature of the coolant used in the first two coolant circuits can be relatively high at the inlet side, in which case the flow of the coolant will be selected such that, in the first heat transfer block, a cooling of the hot 300° charge air is achieved to values around 180° C. and, in the second heat transfer block, to values of a magnitude of 110° C.

In such an embodiment, the forward flow temperature of the coolant in the third heat transfer block can amount to approximately 45 to 50° C., as in conventional coolers, and the air can be cooled to approximately 60° C. or slightly above that.

As an embodiment of the invention, the first heat transfer block can be a circular-tube cooler made of steel, of a copper zinc alloy or of an aluminum alloy. In contrast, the second and the third heat transfer block can be made in a conventional stacked construction of aluminum elements, as described, for example, in German Patent Document DE 196 44 586 A1. Finally, all heat transfer blocks can be combined to a charge air cooler unit which, as a whole, is installed in corresponding facilities or vehicles, but is supplied by different coolant circuits.

The invention is illustrated in the drawing by means of embodiments and will be explained in the following.

DETAILED DESCRIPTION OF THE DRAWINGS

Figure 1:
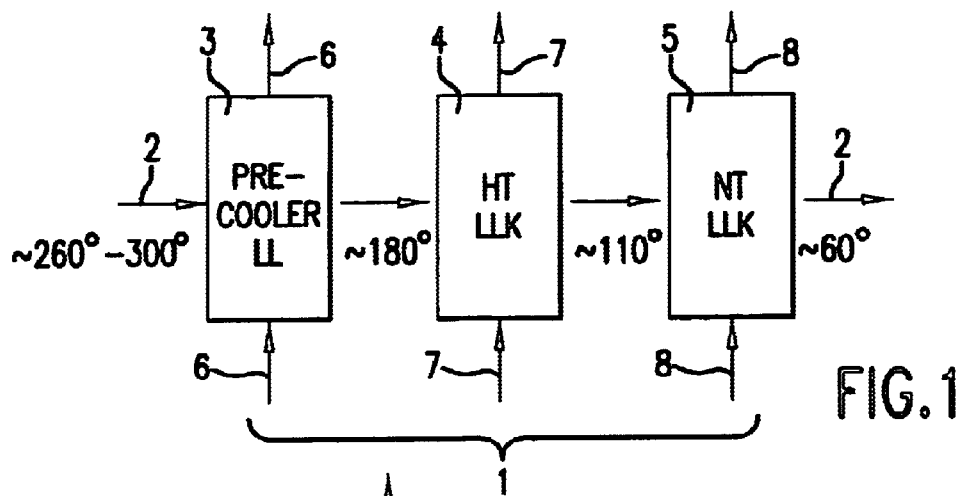
FIG. 1 is a block diagram of a charge air cooler for an internal-combustion engine according to the invention.

FIG. 1 is a schematic view of the basic construction of a charge air cooler 1 according to the invention, in which the charge air, which flows in the direction of the arrows 2 and which reaches the charge air cooler at an entry temperature of up to 300° C. or more, is cooled to a final temperature of approximately 60° C. In order to avoid, at these extremely high entry temperatures, damage to the charge air cooler or its heat transmission elements, it is provided according to the invention that the charge air cooler 1 is constructed of various heat transfer blocks 3, 4, and 5 which, each separately, rest in a separate cooling circulation through which the coolant is guided in the direction of the arrows 6, 7 and 8, in each case, through the heat transfer blocks 3, 4 and 5. According to FIG. 1, the first heat transfer block 3 situated in the flow direction 2 of the charge air is constructed as a so-called precooler which consists of a material which is significantly more erosion-proof and temperature-stable than the material of the heat transfer blocks 4 and 5 which follow. This precooler is also constructed such that it is insensitive with respect to length changes as a result of thermal expansions. The coolant, which flows to and through the first heat transfer block 3 in the direction of the arrows 6 can be assigned to a high-temperature coolant circuit, and, when entering the precooler 3, can have, for example, a temperature of approximately 100° C. As a result of this measure, in addition to the constructional further development of the heat transfer block 3, the temperature difference between the entering charge air and the coolant can also be minimized, so that a certain protection of the heat transfer block 3 is provided against temperature-caused damage.

The second heat transfer block 4 is acted upon by charge air of an entry temperature of approximately 180° C. The charge air is cooled approximately to this temperature in the first heat transfer block 3. The second heat transfer block 4 can also be situated in a high-temperature coolant circuit. It is designed such that the charge air, when exiting from this second heat transfer block 4, has only a temperature of approximately 110° C. The third heat transfer block 5 can therefore-also, as in principle, the heat transfer block 4 be designed in a conventional manner and can therefore be acted upon by coolant. for example, from a low-temperature circuit in the direction of the arrows 8. For example, when entering the heat transfer block 5, this coolant has a temperature of from 45° C. to 50° C., so that, in the third heat transfer block 5, the charge air can be cooled to approximately 60° C.

It is decisive for the invention that the charge air cooler is divided into different heat transfer blocks and into a so-called precooler, which are each acted upon by cooling circulations which can be adapted to the entry temperatures of the charge air.

Figure 2:
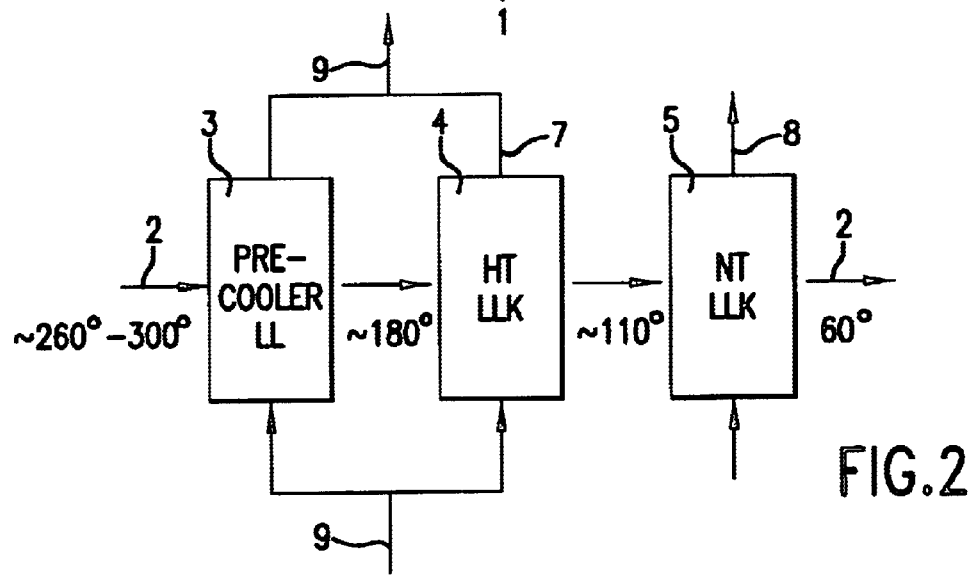
FIG. 2 is block diagram of a variant of a charge air cooler according to the invention.

FIG. 2 illustrates a variant of the charge air cooler according to FIG. 1 in that here the two first heat transfer blocks 3 and 4 are situated in a common cooling circuit 9, while the third heat transfer block 5 is situated in a separate low-temperature circuit, as in the embodiment according to FIG. 1.

Figure 3:
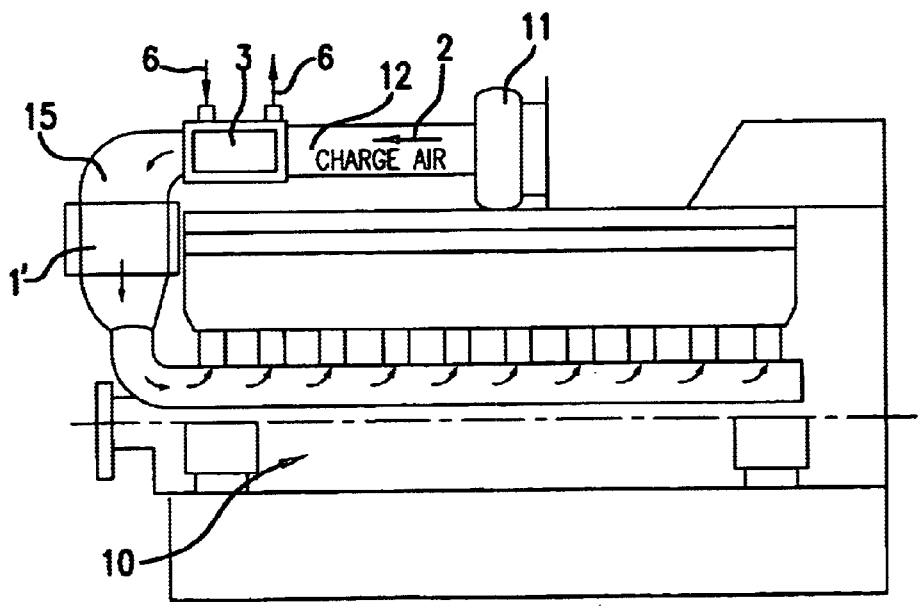
FIG. 3 is a lateral view of an internal-combustion engine which is equipped with charge air coolers according to the invention.
Figure 4:
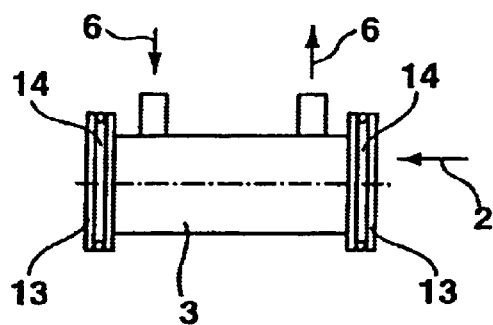
FIG. 4 is an enlarged representation of the precooler of the charge air cooler of FIG. 3 used behind the turbocharger.
Figure 5:
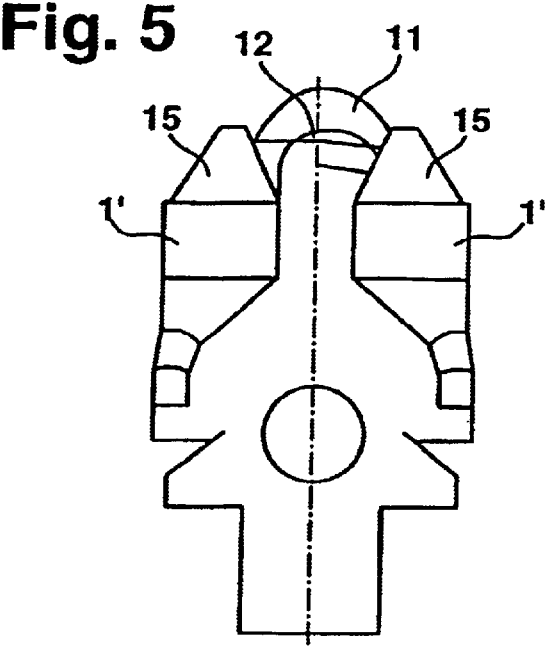
FIG. 5 is a frontal view of the internal-combustion engine according to FIG. 3.

FIGS. 3, 4 and 5 show only a practical example of the further development of a charge air cooler according to the invention. FIG. 3 shows that a turbocharger 11 for the charge air is assigned to an internal-combustion engine 10, such as a large-scale engine, which charge air is supplied to the individual cylinders in the direction of the arrows 2. In this embodiment, it is provided that the precooler 3 is inserted into the feeding tube originating from the turbocharger 11, and in that a charge air cooler 1' is connected behind this precooler 3, which charge air cooler 1' is either of a conventional construction or contains the two heat transfer blocks 4 and 5 which, because of the charge air temperature of 180° C. reached behind the precooler 3, can definitely be constructed in a conventional manner and can be acted upon by coolant.

FIG. 4 shows the precooler 3 which can be inserted into the tube 12 and to which the coolant is supplied by the high-temperature coolant circuit 6. In the embodiment, this precooler 3 is adapted with respect to its diameter to the diameter of the tube 12 and is provided with two holding flanges 13 which are equipped with sealing rings 14.

FIG. 5 illustrates that the charge air coming from the turbocharger 11 is divided behind the precooler 3 into two air paths 15, each assigned to one side of the internal-combustion engine 10, and in that the charge air cooler 1', which contains the heat transfer blocks 4 and 5, is installed in each case in these air paths.

Figure 6:
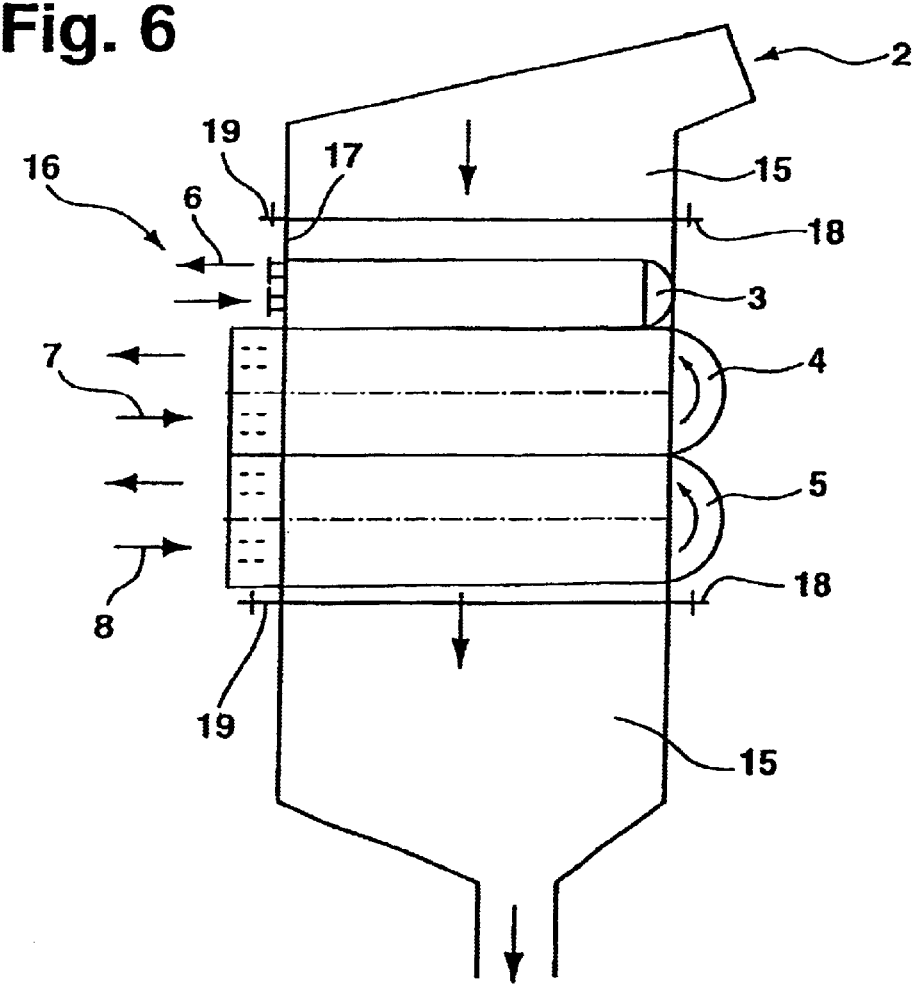
FIG. 6 is an enlarged representation of a charge air cooler according to the invention which can be used as a variant of the charge air cooler according to FIG. 3.

FIG. 6 shows only a variant of a charge air cooler 16 which, instead of the two charge air coolers 1', can be inserted into the feeding tube 15. In this case, the charge air cooler 16 contains all three heat transfer blocks 3, 4 and 5. For this variant, the installation of the precooler 3 according to FIGS. 3 and 4 is therefore not required. The charge air cooler 16 is provided with an installation housing 17 which has flanges 18 and is screwed with these between assigned flanges 19 of the charge air guide 15. According to the diagram illustrated in FIG. 1 or 2, this charge air cooler 16 can be acted upon by different cooling circulations. The precooler 3, which in this embodiment, is integrated in the charge air cooler 16, is also made of a material which differs from that of the heat transfer blocks 4 and 5 which follow.

In all embodiments, it can be provided that the first heat transfer block 3 is a circular-tube cooler or a heat transfer device similar to a bundle of tubes of a circular-tube heat transfer device made of steel, of a copper zinc alloy or of an aluminum alloy. The second and the third head transfer block 4, 5 can be produced in a conventional manner in a stack-type construction of aluminum elements.

What is claimed is:

1. A charge air cooler for internal combustion engines having at least two cooling circulations which are guided through heat transfer blocks which are connected behind one another in a flow direction of air and have different coolant temperatures, wherein at least one of the heat transfer blocks provided as a first heat transfer block in the flow direction of the air is produced of a material more erosion-resistant and temperature-stable than material of the heat transfer blocks which follow, and is situated in a high-temperature coolant circuit which, in use, has a coolant temperature at entry to the heat transfer block higher than other coolant circuits, the coolant temperature of the high-temperature circuit being selected to be as high as possible in order to reduce a temperature gradient between the air and said coolant temperature.

2. The charge air cooler according to claim 1, wherein the first and second of the heat transfer blocks are situated in the high-temperature coolant circuit, and a last heat transfer block is situated in a low-temperature coolant circuit.

3. The charge air cooler according to claim 2,
wherein the temperature of the coolant used in the first and second heat transfer blocks, at an inlet side, is approximately 100° C., and in that a flow of the coolant is selected such that, in the first heat transfer block, a cooling of hot charge air of 300° or more is achieved to values of about 180° C. and, in the second heat transfer block, to values of about 110° C.

4. The charge air cooler according to claim 2,
wherein in the last heat transfer block, a forward-flow temperature of the coolant is approximately 45° C. to 50° C., and the air is cooled to approximately 60° C.

5. The charge air cooler according to claim 2,
wherein the first heat transfer block is a circular-tube cooler made of one of steel, of a copper zinc alloy or of an aluminum alloy.

6. The charge air cooler according to claim 2,
wherein the second and the third heat transfer blocks are produced in a stack-type construction of aluminum elements.

7. A charge air cooler for an internal combustion engine, comprising:
at least two separate coolant flows having different coolant temperatures, and
at least two heat transfer blocks being connected behind one another in a flow direction of air,
wherein each of the separate coolant flows is guided through at least one separate heat transfer block of the at least two heat transfer blocks, and at least a first heat transfer block in the flow direction is made of a material more erosion-resistant and temperature-stable than material of other heat transfer blocks of said at least two heat transfer blocks and is connected to a high-temperature coolant flow of the at least two separate coolant flows, the high-temperature coolant flow, in use, having a coolant temperature at entry to the heat transfer block higher than other coolant flows, the coolant temperature of the high-temperature circuit being selected to be as high as possible in order to reduce a temperature gradient between the air and said coolant temperature.

8. A precooler heat transfer block of a charge air cooler of an internal combustion engine which has at least two cooling circuits with different coolant temperatures guided through heat transfer blocks connected in series in a direction of air flow, the precooler heat transfer block being first in the series and being produced of a material more erosion-resistant and temperature-stable than material of the other heat transfer blocks,
wherein the cooling circuit of the precooler heat transfer block is a high-temperature cooling circuit which, in use, has a coolant temperature at entry to the heat transfer block higher than other coolant circuits, the coolant temperature of the high-temperature circuit being selected to be as high as possible in order to reduce a temperature gradient between the air and said coolant temperature.

9. A method of making a charge air cooler for an internal combustion engine, comprising:
connecting heat transfer blocks in series in a direction of air flow,
separately guiding at least two cooling circuits having different coolant temperatures through the heat transfer blocks,
providing at least a first heat transfer block in the direction of air flow produced from a material more erosion-resistant and temperature-stable than material of the other heat transfer blocks in the series,
selecting the coolant temperature to form one of the cooling circuits as a high-temperature cooling circuit, and
locating the first heat transfer block in the high-temperature cooling circuit, which, in use, has a coolant temperature at entry to the heat transfer block higher than other coolant circuits, the coolant temperature of the high-temperature circuit being selected to be as high as possible in order to reduce a temperature gradient between the air and said coolant temperature.

10. A method according to claim 9,
wherein a first and a second of the heat transfer blocks are located in the high-temperature cooling circuit, and a last heat transfer block is located in a low-temperature cooling circuit.

\* \* \* \* \*